2 Sheets—Sheet 1.

T. W. B. MURRAY & C. J. BAKER.

FOLDING COT.

No. 10,025. Reissued Jan. 31, 1882.

WITNESSES

Fred. G. Dieterich.
P. C. Dieterich.

INVENTORS.

Thomas W. B. Murray,
Caleb J. Baker,
by A. Snow & Co.

Attorneys

N. PETERS, Photo-Lithographer, Washington, D. C.

2 Sheets—Sheet 2.

T. W. B. MURRAY & C. J. BAKER.

FOLDING COT.

No. 10,025. Reissued Jan. 31, 1882.

*WITNESSES*

Fred. G. Dieterich

P. C. Dieterich

*INVENTOR*

Thomas W. B. Murray

Caleb J. Baker, by A. Brown & Co.

*Attorneys*

N. PETERS, Photo-Lithographer, Washington, D. C.

UNITED STATES PATENT OFFICE.

THOMAS W. B. MURRAY AND CALEB J. BAKER, OF CHICAGO, ILLINOIS.

FOLDING COT.

SPECIFICATION forming part of Reissued Letters Patent No. 10,025, dated January 31, 1882.

Original No. 240,533, dated April 26, 1881. Application for reissue filed January 6, 1882.

*To all whom it may concern:*

Be it known that we, THOMAS W. B. MURRAY and CALEB J. BAKER, of Chicago, in the county of Cook and State of Illinois, have invented certain new and useful Improvements in Folding Cots; and we do hereby declare the following is a full, clear, and exact description of the invention, that will enable others skilled in the art to which it appertains to make and use the same, reference being had to the accompanying drawings, and to the letters of reference marked thereon, which form a part of this specification.

Figure 1:
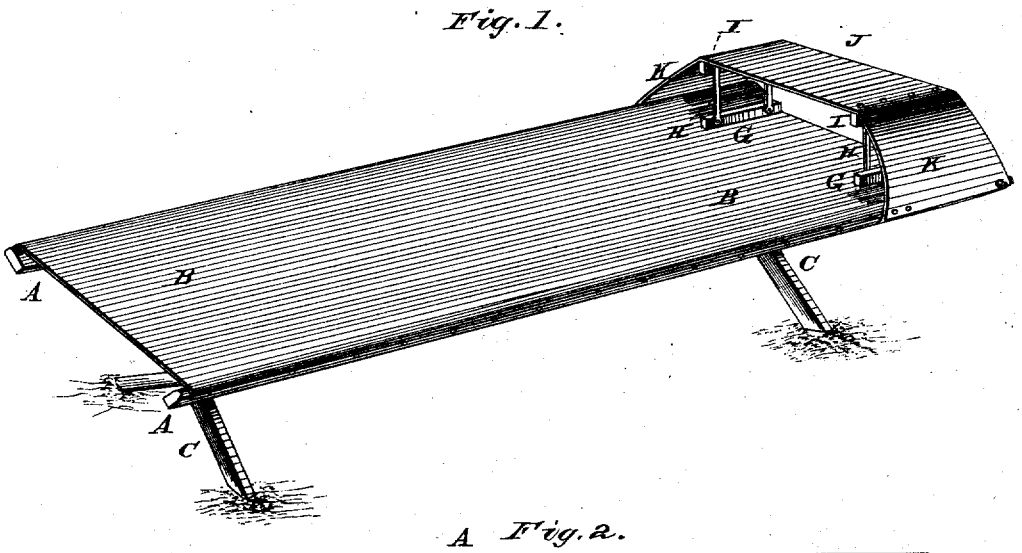
Figure 2:
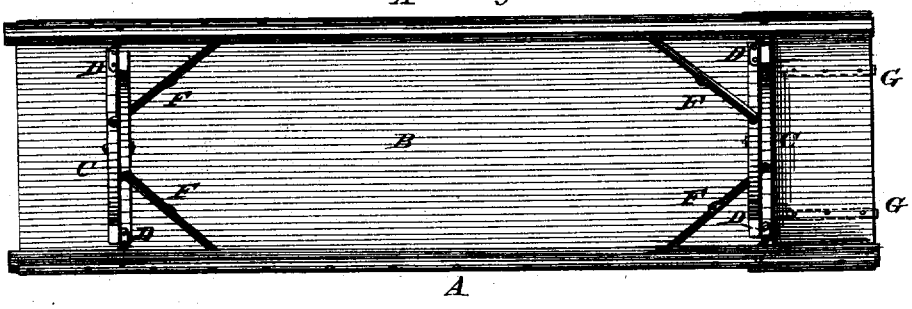
Figure 3:
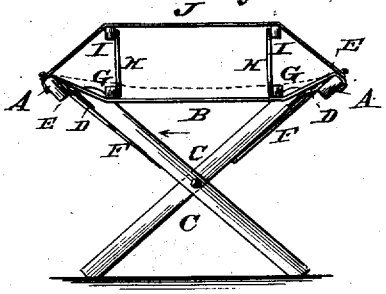
Figure 4:
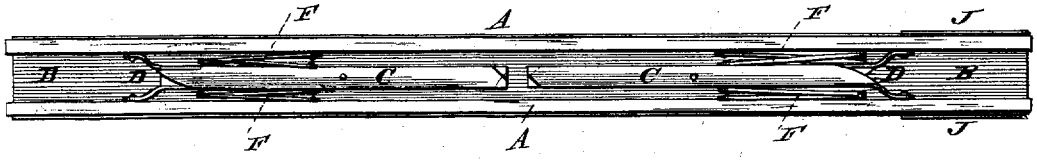
Figure 5:
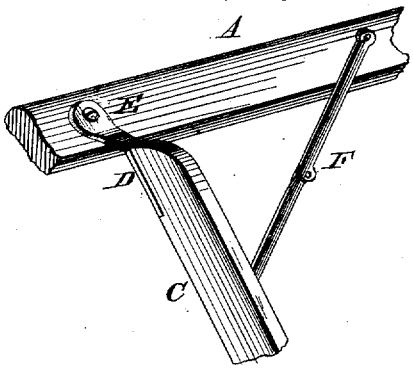
Figure 6:
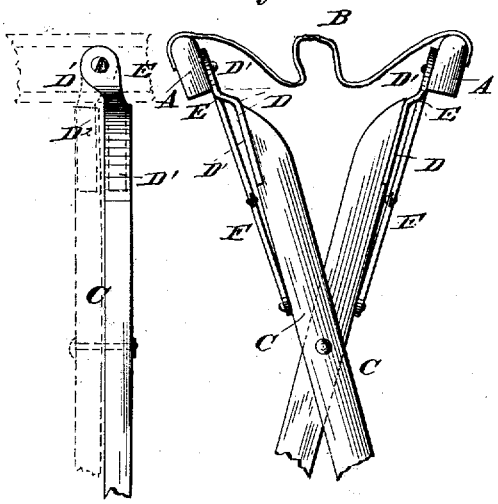

Figure 1 is a perspective view of our improved cot or camp-bed extended. Fig. 2 is a bottom view of the cot extended. Fig. 3 is a rear end view. Fig. 4 is a view of the cot folded. Fig. 5 is a detail view, showing the junction of one of the side rails with one of the legs and braces; and Fig. 6 represents detail views, showing the construction and arrangement of the hinges or angle-irons by which the legs are connected to the side rails.

Corresponding parts in the several figures are denoted by like letters of reference.

This invention relates to folding cots or camp-beds; and it consists in certain improvements in the construction of the same, which will be hereinafter fully described, and particularly pointed out in the claims.

The body of our improved cot is composed of a pair of side rails, A A, connected by a piece of canvas or other flexible material, B, tacked or otherwise secured to the side rails, as shown.

C C are the legs, which are hinged or connected to the side rails—two to each rail—by means of angle-irons or hinge-plates D D, the upper ends of each pair of which, D′, are deflected toward each other, as clearly shown in Fig. 6 of the drawings, so as to bring the axis or pivoting-point of the opposite legs in the same line, while each pair of legs is pivoted together crosswise, so as to permit the side rails and legs to be simultaneously folded, after which the legs may be folded toward each other independently or simultaneously down between the side rails, where they are accommodated in the least possible space.

The angle-irons or hinge-plates D D are bent slightly inward from the side rails, A A, as shown at E E, to accommodate the jointed braces F F, which fold between the legs and the side rails and connect the latter with the former, which are thus braced when extended.

A head-rest or pillow is formed by rods G G, secured longitudinally upon the canvas B at the head end of the cot, and provided at their ends with pivoted standards H H, connected by longitudinal bars I I. The head-rest, which consists of a flexible strip, J, cut slanting at its front end, as shown at K, is secured to the bars I I, and its front corners are tacked to the side rails, while its rear corners are buttoned to the rear ends of the latter, so as to be readily detached when the cot is to be folded.

Our improved cot is simple, durable, and inexpensive. It is strongly braced, so as to be capable of supporting a considerable weight, and may, when not in use, be folded up into very small space, owing to the construction of the angle-irons or hinge-plates D, which permit the legs to be folded together and between the side rails, between which and the said legs the braces F are conveniently accommodated, owing to the bend E of the hinge-plates.

Having thus described our invention, we claim and desire to secure by Letters Patent of the United States—

1. In a folding cot, the angle-irons or hinge-plates D D, the upper ends of each pair of which are deflected toward each other, so as to bring the pivoting-points of the legs C, which they connect, to the side rails of such cot in the same axis, substantially as shown and specified.

2. In a folding cot, the hinge-plates D, bent at E, so as to afford room between the legs and side rails for the jointed braces F, substantially as set forth.

3. In a folding cot, the angle-irons or hinge-plates D, having deflected upper ends, D′, and bent at E, for securing the legs to the side rails, substantially as and for the purpose set forth.

4. The combination of the side rails, A, flexible cover B, legs C, angle-irons D, bent at E, and the jointed braces F, substantially as and for the purpose set forth.

5. In a folding cot having a flexible cover, as shown, the head-rest consisting of rods G G, pivoted standards H H, bars I I, and the flexible strip J, secured to the bars I I, and having its front corners secured permanently and its rear corners detachably to the side rails of the cot, substantially as and for the purpose set forth.

In testimony whereof we affix our signatures in presence of two witnesses.

THOMAS W. B. MURRAY.
CALEB J. BAKER.

Witnesses:
EDWIN F. ABBOTT,
M. A. HUNTER.